United States Patent
Kennedy et al.

(10) Patent No.: US 7,455,868 B2
(45) Date of Patent: Nov. 25, 2008

(54) APPARATUS AND METHOD FOR MAKING ICE CREAM PRODUCTS

(75) Inventors: Rob Kennedy, P.O. Box 394, Rock Island, WA (US) 98850; John Beckmyer, Monitor, WA (US)

(73) Assignee: Rob Kennedy, Rock Island, WA (US)

( * ) Notice: Subject to any disclaimer, the term of this patent is extended or adjusted under 35 U.S.C. 154(b) by 602 days.

(21) Appl. No.: 10/725,000

(22) Filed: Dec. 2, 2003

(65) Prior Publication Data

US 2004/0107844 A1    Jun. 10, 2004

Related U.S. Application Data

(60) Provisional application No. 60/430,355, filed on Dec. 3, 2002.

(51) Int. Cl.
*A23G 9/12*    (2006.01)
(52) U.S. Cl. .................................... 426/565; 426/524
(58) Field of Classification Search ......... 426/564–565, 426/660, 100, 101, 249, 524
See application file for complete search history.

(56) References Cited

U.S. PATENT DOCUMENTS

| | | | |
|---|---|---|---|
| 3,068,105 A | 12/1962 | Morrison | |
| 4,993,238 A | 2/1991 | Inagaki | |
| 5,098,732 A | 3/1992 | Inagaki | |
| 6,510,890 B1 | 1/2003 | Paskach et al. | |

OTHER PUBLICATIONS

Nicholas Kurti et al., Chemistry and Physics in the Kitchen, Scientific American, Apr. 1994, pp. 66, 71.
Brian P. Coppola et al., I Scream, You Scream, Journal of Chemical Education, Dec. 1994, p. 1080, vol. 71, No. 12, The Division of Chemical Education of the American Chemical Society.
David A. Katz, Liquid Nitrogen Ice Cream, © 1997, 2003, 1 page (obtained online from http://www.chymist.com/Liquid%20N2%20ice%20cream.pdf).
H. Henry Rieke IV, Cooking with Chemistry, © 1996-2002, pp. 1-3 (obtained online from http://www.polsci.wvu.edu/Henry/Icecream/Icecream.html).
Peter Barham, The Science of Cooking, © 2001, Springer-Verlag, Berlin, Heidelberg.
Liquid Nitrogen Ice Cream, date unknown, 3 pages (obtained online from http://www.schnozzle.org/~paulh/recipes/icecream.pdf and http://www.ed.sc.edu/idp/high/icecream-nitrogen.pdf).

(Continued)

*Primary Examiner*—Arthur L Corbin
(74) *Attorney, Agent, or Firm*—Venable LLP; Clifton E. McCann; Steven J. Schwarz

(57) ABSTRACT

Ice cream products are made quickly by mixing ingredients with a liquefied gas in an open container from which clouds of vapor emanate. A deflector close above the open container keeps the vapor from rising away from the container and directs it laterally and downwardly around the container. A source of colored light is visible through openings in a powered mixer used to produce the ice cream products, and a heater prevents the products from freezing to the container. The ice cream products are made in a place where customers can see and feel the vapor.

12 Claims, 2 Drawing Sheets

OTHER PUBLICATIONS

Anne Marie Helmenstine, How To Make Liquid Nitrogen Ice Cream?, date unknown, 2 pages (obtained online from http://www.helpscience.com/know_chem5.htm).

Student Affiliates, American Chemical Society, May 3, 2005, pp. 1-6, Department of Chemistry, University of Maine, Orono, Maine (obtained online at http://chemistry.umeche,maine.edu/Department/ACS.html).

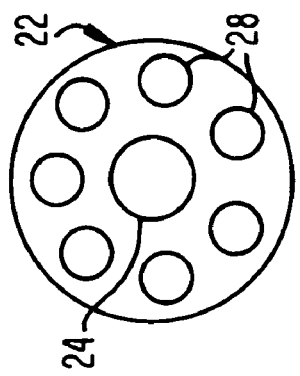
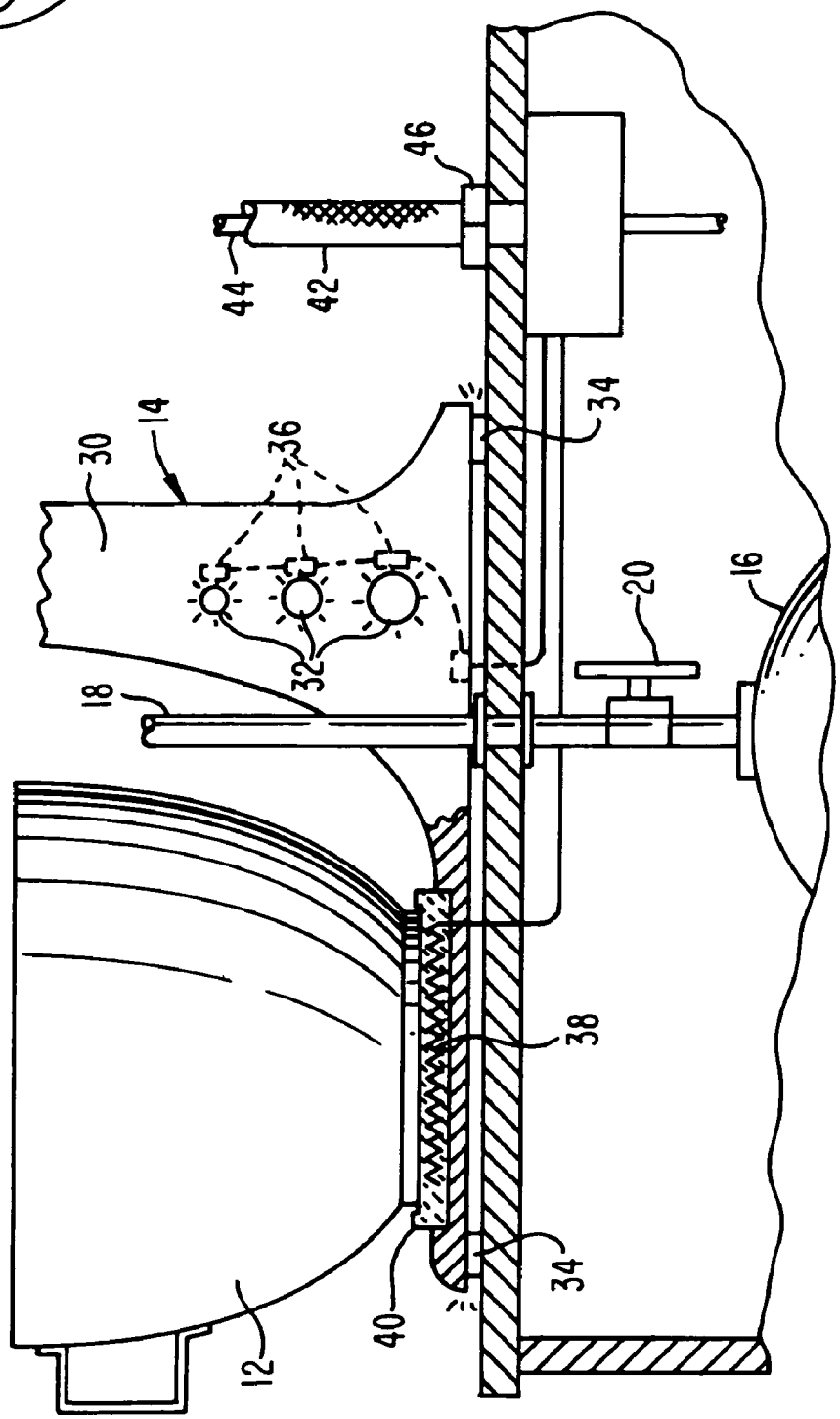

APPARATUS AND METHOD FOR MAKING ICE CREAM PRODUCTS

CROSS-REFERENCE TO RELATED APPLICATIONS

This application claims the benefit of U.S. Provisional Application No. 60/430,355, filed on Dec. 3, 2002.

BACKGROUND OF THE INVENTION

The present invention relates to apparatus and a method for making ice cream products and, more particularly, to making such products quickly.

Traditionally, ice cream and other ice cream products, such as sherbet and soft ice cream, have been prepared well in advance of the time of sale. Historically, although a wide selection of flavors was often available, there was no capability of providing, at the time an order was placed, ice cream products having ingredients chosen by a customer.

U.S. Pat. No. 5,098,732 to Inagaki discloses a method and apparatus for allowing a consumer to select ingredients and then quickly making an ice cream product in response to the consumer's order. More specifically, the material bulk of the ice cream to be produced is prepared by mixing ingredients, after selection by an individual, in a container wherein liquid nitrogen or a liquid nitrogen based gas is introduced and by chilling the bulk while it is agitated. The container in which the ice cream product is made is closed, and the liquid nitrogen or liquid nitrogen based gas is introduced to the closed container through a cooling whirl inside the closed container.

SUMMARY OF THE INVENTION

In the present invention, an ice cream product is made quickly by mixing a liquefied gas with ingredients selected by a customer in an open container from which clouds of vapor emanate. Although the top of the container need not be entirely open, the container has at least an opening or a plurality of openings of sufficient area to enable clouds of vapor to pass from the container to the surroundings. The clouds are produced during the ice cream making process, creating an unusual, pleasing spectacle and entertaining the customer. Liquid nitrogen is a preferred liquefied gas.

Preferably, a deflector is positioned just above the open container to direct the clouds of vapor laterally at the top of the container, thereby keeping the clouds low, around the container rather than permitting them to rise away from the container. Because the cold vapor is heavier than air, it descends along the sides of the container after the energy of vapor generation dissipates. The deflector can extend laterally beyond the perimeter of the container, along at least most of the perimeter.

Also preferably, the ice cream is produced in a powered mixer having a support through which at least one opening is defined. A source of colored light is provided inside the support such that the colored light passes through the opening to the surroundings and adds to the visual effect. During the ice cream making product, the container becomes frosted. The ice cream making equipment has an outer space fiction design reminiscent of the Buck Rogers stories that adds to the experience.

The container is heated sufficiently to prevent both the ingredients and the ice cream from freezing to the container. In one embodiment, the container is disposable, being sufficiently inexpensive that a customer can just carry out the ice cream and the container, as is commonly done with conventionally made ice cream products. Suitable disposable containers include containers made of paper or Styrofoam.

As used herein, the terms "ice cream" and "ice cream products" are considered to include but not be limited to traditional ice cream, sherbet, soft ice cream, frozen yogurt, gelato, soy-based ice cream, and milkshakes. For milkshakes, a smaller amount of liquefied gas is used.

BRIEF DESCRIPTION OF THE DRAWINGS

FIG. 2 is a partial side view of the apparatus of FIG. 1 schematically showing a heater for the container and a light source inside the mixer support; and FIG. 3 is a top plan view of one embodiment of a deflector to be positioned above the container.

DETAILED DESCRIPTION OF THE PREFERRED EMBODIMENTS

Figure 1:
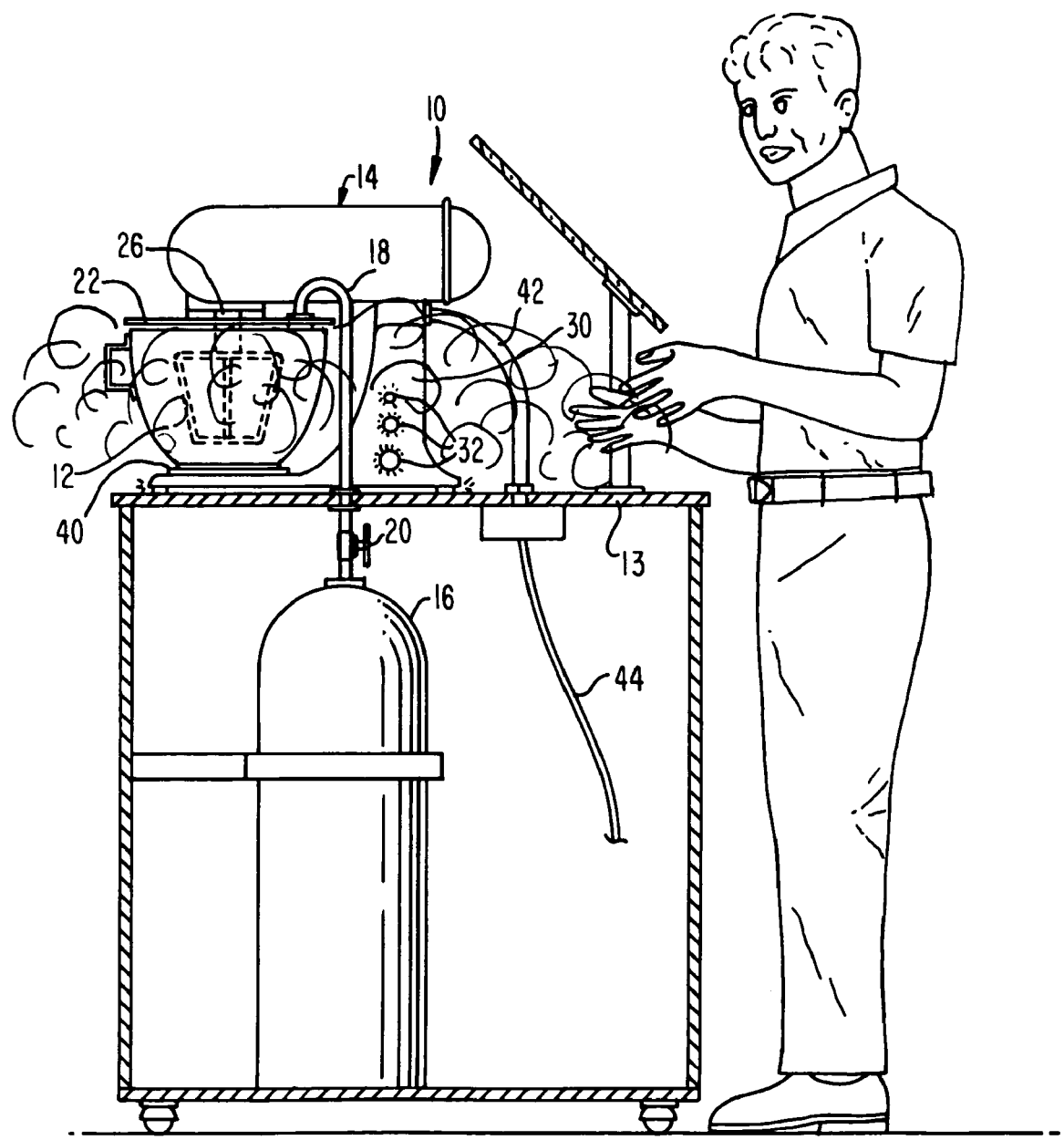
FIG. 1 is a side elevation of an apparatus according to the present invention, positioned next to a customer, for instantly making ice cream.

As can be seen from FIG. 1, the instant ice cream making apparatus according to the present invention, which is designated generally by the reference numeral 10 and includes an open container 12, is positioned in a food service establishment such that a customer can see the ice cream making process according to the present invention and even touch cold clouds of vapor that are a part of the ice cream making process. For example, the apparatus 10 can be placed on a horizontal surface 13 adjacent to an area accessible by customers in an arrangement such that at least the open container 12 and the vapor clouds are visible to customers. In addition, the open container is sufficiently close to the customers and the arrangement is sufficiently free of barriers that the customers can touch the vapor.

In accordance with the present invention, ingredients for an ice cream order are placed in an open container. The ingredients can include ingredients selected on the spot by a customer. For this purpose, containers of ingredients (not shown) can be provided within the view of the customer and can include, but are not limited to, ingredients such as fresh, frozen or partially-thawed fruits, candies, including hard candies, and powders, including cake mixes and gelatin powders.

The ingredients in the container 12 are mixed by a powered mixer 14 that can be a conventional food mixer. In order to quickly freeze the ingredients into an ice cream product, a source of a liquefied gas, typically a cryogenic tank 16, is positioned adjacent to the mixer, with a line 18 extending from the tank to the mixer. In a preferred arrangement, the tank 16 is positioned under a counter, and the line 18 extends through the counter and terminates at the opening of the container 12. A control valve 20 is provided to selectively control the flow of the liquefied gas from the tank 16 to the container 12. The valve 20 can be a solenoid-operated valve. A preferred liquefied gas is liquefied nitrogen.

When the liquefied gas exits the end of the line 18, it produces a cold, visible vapor. Since the container 12 is open, the vapor is visible to those around, including customers, because the mixer and container are positioned within the view of customers.

As the liquefied gas flows into the container 12, the mixer 14 operates to mix the various ingredients and to mix in with them an amount of the liquefied gas sufficient to turn the ingredients into an ice cream product. The amount of liquefied gas used depends on the desired product. For example, the amount of liquefied gas used to make a milkshake is less than the amount used to make hard ice cream.

As the vapor generates, it tends to rise out of the bowl. For this reason, the apparatus 10 according to the present invention includes a deflector 22 positioned just above the opening of the container 12, for example, about one-half inch above the upper rim of the container. The deflector 22 extends laterally beyond the perimeter of the container 12 all around the perimeter of the container, typically by an inch or less. The deflector 22 directs the generated vapor laterally and, thus, keeps it from moving up and away from the container 12. The cold vapor is heavier than air and, therefore, after the energy of generation has dissipated, the vapor drifts downwardly. As a result, after the deflector 22 directs the vapor laterally outward from the container 12, the vapor drifts downwardly along the sides of the container 12, somewhat reducing the visibility of the container. Sufficient liquefied gas is used that it surrounds at least most of the container.

The deflector 22 is advantageously mounted to the mixer 14 and, as can be seen from FIG. 3, contains an opening 24 to permit a mixing element 26 of the mixer 14 to pass through the deflector and into the container. A preferred embodiment of the deflector 22 is made of stainless steel with circular areas of a transparent unbreakable material 28, such as that commercially available under the trademark Plexiglas.

As can be seen from FIGS. 1 and 2, the mixer has a support 30 through which a number of openings 32 are formed. A source of colored light is positioned inside the support 30 such that the colored light passes through the openings 22 to the surroundings, where it is visible. In addition, the support 30 for the mixer is open at the bottom and has a plurality of feet or pads 34 to support the open bottom slightly above the support surface. The colored light also passes outward from the bottom of the mixer support. A preferred source of colored light is light emitting diodes (LED's) 36.

In order to prevent the ingredients from becoming frozen to the container 12, an arrangement for heating the container during the ice cream making process is provided. As can be appreciated from FIG. 2, a preferred form for the heating arrangement is an electric resistance heating element 38 in a base 40 on which the container 12 for the ice cream rest. The container 12, of course, contacts the base 40, and heat is transferred to the container, thereby preventing the ingredients from freezing to the container.

A power cord 44 extends from the mixer 14 and through the horizontal surface 13, where it is secured by, for example, a threaded fastener arrangement 46. As can be seen from FIG. 2, the power cord 44 can have a braided covering 42.

The finished ice cream product can be scooped out of the container and moved to another container for serving to a customer, or the ice cream product can be made in a disposable container that the customer can carry out. Conventional ice cream containers of, for example, paper or Styrofoam can be used for this purpose.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

What is claimed as new and desired to be protected by Letters Patent of the United States is:

1. A method of making an ice cream product, comprising:
   placing ingredients of the ice cream product into a container having an open top;
   using a control valve to selectively dispense a cryogenic liquefied gas from a cryogenic tank into the container through a line having an opening mounted above the ingredients of the ice cream product; and
   mechanically mixing the ingredients with the liquefied gas in the open top container to produce the ice cream product;
   wherein a sufficient amount of the liquefied gas is introduced into the container to produce a visible amount of cryogenic vapor flowing from the open top of the container.

2. The method of claim 1, wherein the liquefied gas is liquefied nitrogen.

3. The method of claim 1, further comprising heating the container to prevent the ice cream product from freezing to the container.

4. The method of claim 1, wherein the step of mechanically mixing comprises mechanically mixing the liquefied gas with the ingredients using a mixing element of a powered mixer.

5. The method of claim 1, wherein the ingredients and the liquefied gas are mixed in a disposable container.

6. The method of claim 5, wherein the disposable container containing the mixed frozen ingredients is passed to a customer.

7. The method of claim 1, wherein the step of mixing comprises mixing in sufficient liquefied gas to surround at least most of the container.

8. The method of claim 1, further comprising deflecting laterally, slightly above the top of the container, vapor rising from the container.

9. The method of claim 1, further comprising positioning the container in a place in a food service establishment where the vapor is visible to a customer.

10. The method of claim 1, further comprising positioning the container in a place in a food service establishment where the vapor can be touched by a customer.

11. The method of claim 1, wherein the ingredients of the ice cream product include solid ingredients, and the step of mechanically mixing includes mixing the solid ingredients in the open-top container.

12. The method of claim 11, wherein the solid ingredients comprise at least one of frozen fruit and hard candy.

* * * * *